(12) United States Patent
Aoike

(10) Patent No.: US 7,530,500 B2
(45) Date of Patent: May 12, 2009

(54) MOBILE COMMUNICATION TERMINAL AND METHOD FOR CONTROLLING OPERATION THEREOF

(75) Inventor: Tooru Aoike, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 11/195,126

(22) Filed: Aug. 2, 2005

(65) Prior Publication Data

US 2006/0027656 A1 Feb. 9, 2006

(30) Foreign Application Priority Data

Aug. 9, 2004 (JP) ............................. 2004-232082

(51) Int. Cl.
*G06K 19/06* (2006.01)
*G06K 7/08* (2006.01)
(52) U.S. Cl. ...................................... 235/492; 235/451
(58) Field of Classification Search ................. 235/451, 235/492; 705/65
See application file for complete search history.

(56) References Cited

U.S. PATENT DOCUMENTS

2003/0027604 A1* 2/2003 Hayashi ...................... 455/567
2005/0149457 A1* 7/2005 Cihula ......................... 705/65

FOREIGN PATENT DOCUMENTS

| JP | 9-200303 | 7/1997 |
| JP | 11-341110 | 12/1999 |
| JP | 2000-076399 | 3/2000 |
| JP | 2001-273528 | 10/2001 |
| JP | 2003-60748 | 2/2003 |

* cited by examiner

*Primary Examiner*—Thien M. Le
*Assistant Examiner*—April A Taylor
(74) *Attorney, Agent, or Firm*—Scully, Scott, Murphy & Presser, P.C.

(57) ABSTRACT

When a non-contact type IC of a mobile communication terminal is used, equipment or location is identified from equipment identification information, and a pre-specified melody, tone or music is sounded from a speaker as a confirmation sound, and thereby, a user can confirm whether communication is normally succeeded by a desired sound. Through communication between the non-contact type IC and an external non-contact type IC reader/writer, a CPU acquires equipment identification information about the non-contact type IC reader/writer. This equipment identification information is specific to the non-contact type IC reader/writer and enables identification of the installation location, type and the like of the non-contact type IC reader/writer. The CPU refers to a ROM with the use of the extracted equipment identification information; reads from the ROM confirmation voice signal data corresponding to equipment identification information identical to the received equipment identification information, among confirmation voice signal data associated with equipment identification information, which are set in the ROM in advance; and supplies the confirmation voice signal data to a speaker. Thereby, a confirmation sound with a tone corresponding to the equipment identification information is generated as a ring alert sound.

8 Claims, 2 Drawing Sheets

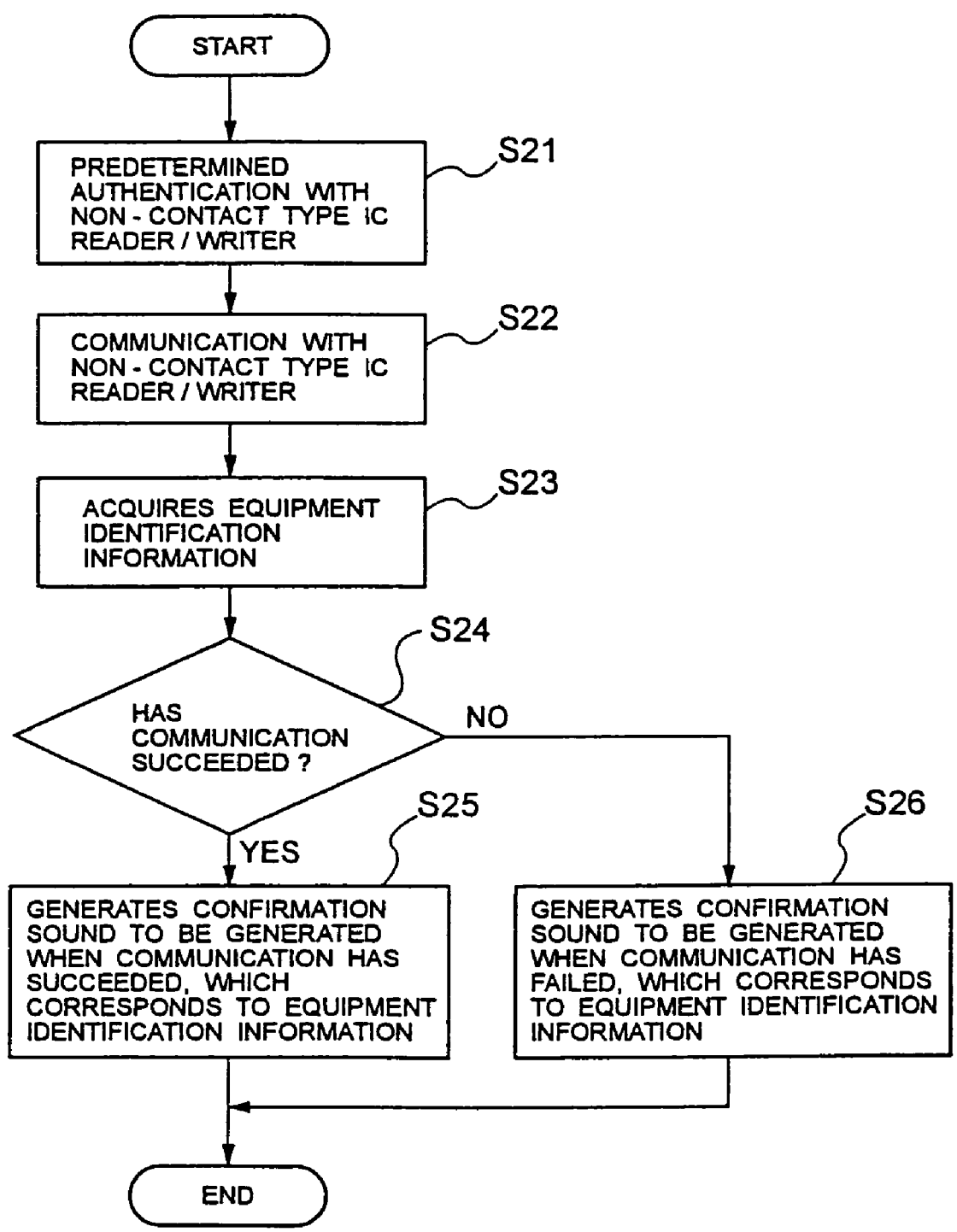

MOBILE COMMUNICATION TERMINAL AND METHOD FOR CONTROLLING OPERATION THEREOF

BACKGROUND OF THE INVENTION

1. Field of the Invention

The present invention relates to a mobile communication terminal and a method for controlling the operation thereof, and in particular to a mobile communication terminal provided with a non-contact type IC (integrated circuit) used for sending/receiving various information to/from a non-contact type reader/writer and performing predetermined processing, such as a mobile phone, a PHS (personal handy-phone system) and a PDA (personal data assistance or personal digital assistant: mobile-type personal information communication equipment).

2. Description of the Prior Art

There are known mobile communication terminals mounted with a non-contact type IC (for example, see Patent Document 1). A prior-art mobile communication terminal described in Patent Document 1 is provided with a display. The mobile communication terminal comprises a medium bearing body for exchangeably bearing a non-contact type IC having a recording area (non-contact type IC medium), a wireless sending/receiving circuit which includes an antenna embedded in the case of the terminal, and a control circuit for controlling mutual reading and writing of digital information by the non-contact type IC born by the medium bearing body and an external non-contact type IC medium located within the area covered by the antenna, from and to their recording areas, via the wireless sending/receiving circuit. The mobile communication terminal, moreover, comprises information processing means for performing information processing based on the read digital information, and displaying information about the result of the information processing on the display as well as recording the result in the recording area of the born non-contact type IC or the external non-contact IC medium through the control circuit.

According to this prior-art mobile communication terminal, it is possible to perform communication between the non-contact type IC born by the medium bearing body and an external non-contact type IC medium. Thereby, it is possible to bring the mobile communication terminal near to a POS terminal, an automatic vending machine, a mobile payment terminal or the like to perform electronic payment processing and store the result of the payment processing in the recording area of the born non-contact type IC, and it is also possible to use the mobile communication terminal as a prepaid card such as a gift card, a novelty card, a railroad pass and a telephone card.

[Patent Document 1] Japanese patent Laid-Open No. 2000-76399

In the above-described prior-art mobile communication terminal mounted with a non-contact type IC, however, a predetermined confirmation sound is set irrespective of whatever the communication counterpart equipment with an external non-contact type IC medium (reader/writer) is or wherever the counterpart equipment is located. Therefore, it is not possible to specify a sound with a tone, melody or the like desired by a user as a confirmation sound based on the equipment mounted with a reader/writer or the location of the equipment.

The object of the present invention is to provide a mobile communication terminal provided with a non-contact type IC which enables a user to confirm whether communication is normally performed by means of a sound of user's taste, by identifying equipment and a place from equipment identification information and sounding a pre-specified melody, tone, music or the like from a speaker when a non-contact type IC is used, and the method for controlling the operation of the mobile communication terminal.

BRIEF SUMMARY OF THE INVENTION

A mobile communication terminal according to the present invention is a mobile communication terminal having a function of performing wireless communication with a base station, the mobile communication terminal comprising: a non-contact type IC for performing non-contact short-distance communication with a reader/writer; storage means for storing in advance voice data mutually different according to identification information identifying the reader/writer; reading means for, based on the identification information of the reader/writer obtained from a signal received by the non-contact type IC, reading voice data corresponding to the identification information from the storage means; and sound generation means for generating a sound based on the voice data read by the reading means.

Furthermore, the mobile communication terminal further comprises: determination means for determining success or failure of communication based on whether the equipment identification information about the reader/writer is obtained from the signal received by the non-contact type IC; and display means for displaying the result of the determination by the determination means.

When the voice data corresponding to the equipment identification information of the reader/writer is not stored in the storage means, the reading means reads second voice data which is stored in the storage means in advance to be used in the case of communication success, and causes the sound generation means to generate a sound based on the second voice data.

When a received signal is not inputted from the non-contact type IC, the reading means reads third voice signal data which is stored in the storage means in advance to be used in the case of communication failure, and causes the sound generation means to generate a sound based on the third voice data.

The voice signal data are stored in the storage means with any one of parameters of a tone, melody, sound volume, discontinuous sound pattern and voice set therefor in a manner that the parameter is mutually different among the voice signal data.

A method for controlling the operation of a mobile communication terminal, according to the present invention is a method for controlling the operation of a mobile communication terminal which includes wireless communication means for performing wireless communication with a base station and a non-contact type IC for performing non-contact short-distance communication with a reader/writer, the method comprising the steps of:

reading, from storage means in which voice data mutually different according to identification information identifying the reader/writer have been stored in advance, voice data corresponding to the identification information about the reader/writer obtained from the signal received by the non-contact type IC; and causing sound generation means to generate a sound based on the voice data read by the reading means.

The operation control method further comprises the steps of: determining success or failure of communication based on whether the equipment identification information about the reader/writer is obtained from the signal received by the non-contact type IC; and displaying the result of the determination by the determination step.

The operation control method further comprises a step of, when the voice data corresponding to the equipment identification information about the reader/writer is not stored in the storage means, reading second voice data which is stored in the storage means in advance to be used in the case of communication success, and causing the sound generation means to generate a sound based on the second voice data.

The operation control method further comprises a step of, when a received signal is not inputted from the non-contact type IC, reading third voice signal data which is stored in the storage means in advance to be used in the case of communication failure, and causing the sound generation means to generate a sound based on the third voice data.

A program according to the present invention is a program for causing a computer to perform the operation of a mobile communication terminal which includes wireless communication means for performing wireless communication with a base station and a non-contact type IC for performing non-contact short-distance communication with a reader/writer, the program comprising the processes of: reading, from storage means in which voice data mutually different according to identification information identifying the reader/writer are stored in advance, voice data corresponding to the identification information about the reader/writer obtained from the signal received by the non-contact type IC; and causing sound generation means to generate a sound based on the voice data read by the reading means.

The operation of the present invention will be described. A mobile communication terminal having a function of performing wireless communication with a base station is provided with a non-contact type IC, and the non-contact type IC is activated by bringing it close to a non-contact type IC reader/writer. The installation location and the like of the non-contact type IC reader/writer are identified from equipment identification information obtained through short-distance communication between the non-contact type IC and the non-contact type IC reader/writer, and a sound with a pre-specified, desired parameter (melody, voice, music or the like) can be generated as a ring alert sound according to the equipment identification information

BRIEF DESCRIPTION OF THE DRAWINGS

FIG. 2 is a flowchart for illustrating the operation of the embodiment of the present invention.

DETAILED DESCRIPTION OF THE PREFERRED EMBODIMENTS

Figure 1:
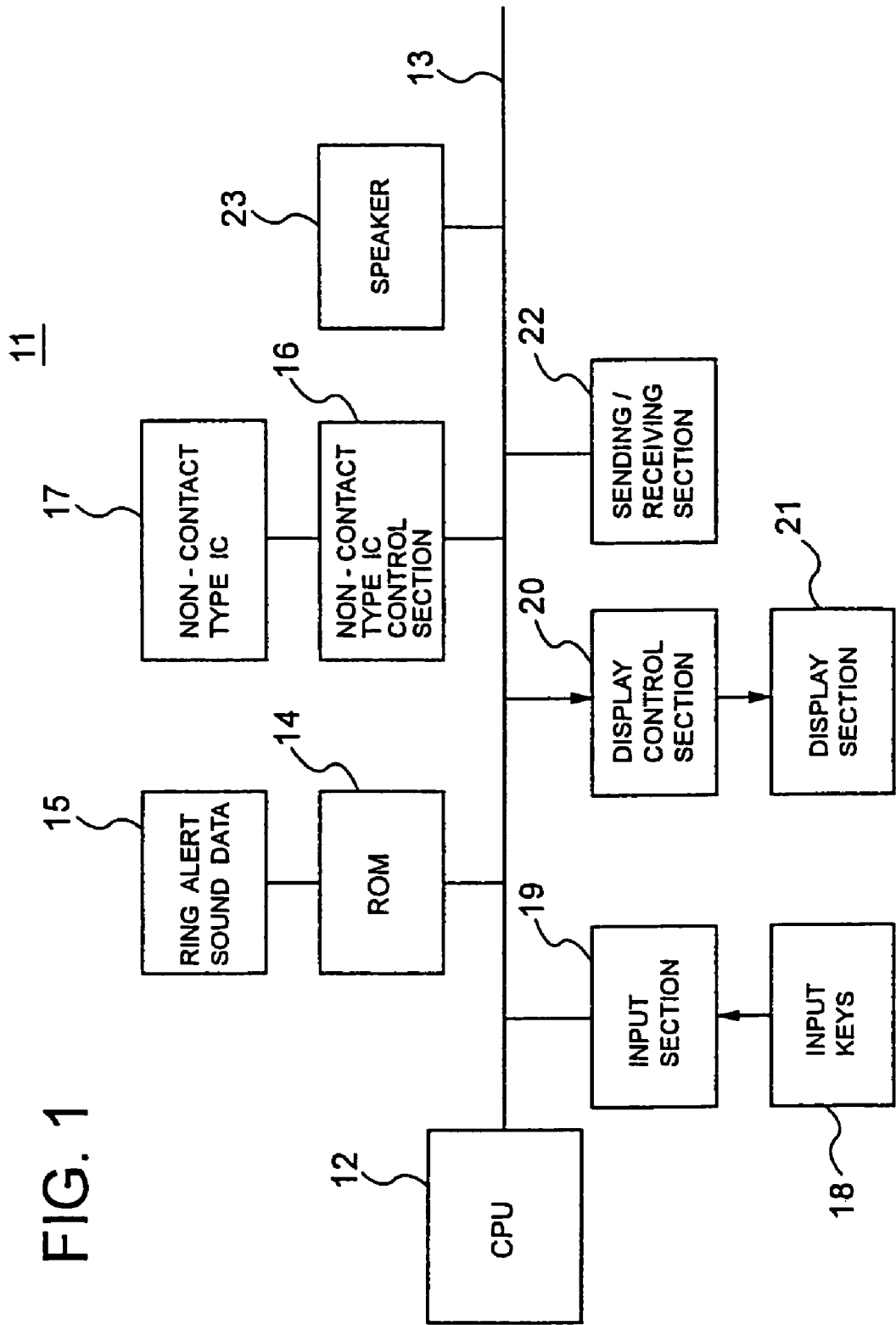
FIG. 1 is a block diagram of an embodiment of the present invention.

Next, a preferred embodiment of the present invention will be described with reference to drawings. FIG. 1 is a block diagram showing an embodiment of a mobile communication terminal according to the present invention. This embodiment shows an example in which the present invention is applied to a mobile phone. In a mobile phone 11, a central processing unit (CPU) 12 for performing overall control of the entire mobile phone is connected to a read-only memory (ROM) 14, a non-contact type IC control section 16, an input section 19, a display control section 20, a sending/receiving section 22 and a speaker 23 via the bus 13.

The ROM 14 is a memory in which various control programs to be executed by the CPU 12 and fixed data such as ring alert sound data 15 such as a melody, voice and music. The non-contact type IC control section 16 is a circuit for controlling a non-contact type IC 17. The input section 19 is a circuit for detecting key input by input keys 18.

The display control section 20 is a circuit for controlling display of a display section 21. The display section 21 is a display device, such as a black-and-white or color liquid crystal panel or organic EL (electroluminescence) material, which is arranged at the front of the terminal body not shown. The sending/receiving section 22 is a circuit for performing wireless communication with a base station not shown to perform receiving, sending, calling or communication. The speaker 23 is a device for generating a melody, a voice or a ring alert sound. In addition, the mobile phone is also provided with a microphone for collecting transmitted voice and the like. However, those that are not directly relevant to the gist of the present invention are not shown.

Next, the operation of this embodiment of the present invention will be described along a process from authentication of a non-contact type IC reader/writer to generation of a confirmation sound (ring alert sound) with reference to a flowchart of FIG. 2. First, when the mobile phone 11 is brought within a predetermined distance from a non-contact type reader/writer, communication for predetermined authentication is performed between the non-contact type IC 17 and the non-contact type IC reader/writer (step S21). That is, when the non-contact type IC 17 of the mobile phone 11 is brought within a predetermined distance from the non-contact type IC reader/writer, the non-contact type IC 17 receives weak radio waves from the antenna of the non-contact type IC reader/writer, and electric power is generated in the non-contact type IC 17. The non-contact type IC 17 is activated thereby, and mutual short-distance communication is performed between the non-contact type IC 17 and the non-contact type IC reader/writer to perform mutual authentication (step S21).

When the mutual authentication has succeeded, the non-contact type IC 17 performs communication with the non-contact type IC reader/writer (step S22), and acquires equipment identification information via the non-contact type IC reader/writer (step S23). This equipment identification information is information specific to the non-contact type IC reader/writer, which enables identification of the installation location and the type of the non-contact type IC reader/writer.

The CPU 12 determines whether or not the communication between the non-contact type IC 17 and the non-contact type IC reader/writer has succeeded, by using a received signal from the non-contact type IC control section 16 (step S24). If the communication succeeds, the CPU 12 extracts equipment identification information in the received signal and refers to the ROM 14 with the use of the extracted equipment identification information. Then, the CPU 12 reads from the ROM 14 confirmation voice signal data corresponding to equipment identification information identical to the received and extracted equipment identification information among data of confirmation voice signals to be generated in the case of success according to equipment identification information, which are set in the ROM 14 in advance. The confirmation voice signal data is then supplied to the speaker 23 via the bus 13, and thereby a confirmation sound with a tone corresponding to the equipment identification information is generated as a ring alert sound (step S25).

If the voice signal data corresponding to the received equipment identification information is not stored in the ROM 14 though communication has succeeded, then the CPU 12 reads voice signal data predetermined for a success confirmation sound and stored in advance from the ROM 14, and supplies it to the speaker 23. Thereby, the predetermined success notification sound is generated as a ring alert sound. That is, in this case, it can be confirmed from the ring alert sound with a success notification tone that the non-contact type IC 17 has succeeded in short-distance communication with the non-contact type IC reader/writer though the non-contact type IC reader/writer is not the one that is located at a place pre-specified by the user. Of course, a sound desired by the user can be set as the success notification tone.

On the other hand, if communication between the non-contact type IC 17 and the non-contact type IC reader/writer has failed, the CPU 12 reads and generates a preset confirmation voice signal to be generated in the case of failure from the ROM 14, corresponding to equipment identification information, and supplies it to the speaker 23 via the bus 13. Thereby, the confirmation sound with a failure notification tone is generated (step S26). In this case also, a sound desired by the user can be set as the failure notification tone.

Thus, according to this embodiment, in the case of using a mobile phone at a ticket gate at a station, for example, since the fact that the location is a station ticket gate, the station name and the like can be acquired from equipment identification information, it is possible to generate a confirmation sound with a specified desirable tone as a ring alert sound from the speaker 23 every time the non-contact type IC 17 is used at a ticket gate of a specified station, by setting a specified ring alert sound for each station name. Accordingly, it is possible to confirm the station name and success in the use by the confirmation sound and confirm failure by a confirmation sound for notification of failure.

The present invention is not limited to the embodiment described above. For example, though description is made on the case of the mobile phone 11 in the above embodiment, the same effect can be obtained in the case of other mobile terminals such as a PHS by generating a confirmation sound based on equipment identification information. Furthermore, though description is made using an example in where the tone of a confirmation sound can be changed according to equipment identification information, in the above embodiment, the parameter of a voice signal which differs according to equipment identification information may be any one of a sound volume, a melody and a discontinuous sound pattern, combination of any one of these and a tone, or a voice.

Furthermore, in the above embodiment, description is made using an example in which a user confirms success/failure of communication between the non-contact type IC 17 and a non-contact type IC reader/writer only by means of a sound. However, predetermined confirmation display may be shown on the display section 21 together with generation of a sound. Furthermore, in the above embodiment, description is made on the assumption that one non-contact type IC reader/writer has one function. However, when one non-contact type IC reader/writer is capable of multiple functions, a confirmation sound for notifying success and a confirmation sound for notifying failure may be set for each of the functions.

Furthermore, in the above embodiment, description is made using an example in which a non-contact type IC reader/writer is provided at a ticket gate of a station. However, the installation location of a non-contact type IC reader/writer is not limited thereto. A non-contact type IC reader/writer may be, of course, installed at a predetermined position of a hospital, a financial institution, a convenience store or a store so that the mobile communication terminal mounted with a non-contact type IC can be used as a patient's registration card, a cash card, electronic money.

According to the present invention, the installation location and the like of a non-contact type IC reader/writer are identified from equipment identification information obtained from short-distance communication between a non-contact type IC and the non-contact type IC reader/writer, and a sound with a pre-specified, desired parameter (melody, voice, music or the like) is generated as a ring alert sound according to the equipment identification information. Thereby, it is possible for a user to confirm whether communication is normally performed by a ring alert sound with a desired parameter, as well as confirming the installation location of the non-contact type IC reader/writer by the ring alert sound with a desired parameter. (For example, it is possible to set a ring alert sound A for a ticket gate of a station and a ring alert sound B for a ticket gate of another station.)

Furthermore, according to the present invention, a confirmation sound is also used as a ring alert sound, and therefore, increase in the memory capacity of storage means is not especially required when the present invention is applied. Accordingly, an effect of preventing increase in cost of the terminal can be obtained.

What is claimed is:

1. A mobile communication terminal having a function of performing wireless communication with a base station, the mobile communication terminal comprising:

a non-contact type IC for performing non-contact short-distance communication with a reader/writer;

storage means for storing in advance voice data mutually different according to identification information identifying the reader/writer;

reading means for, based on the identification information of the reader/writer obtained from a signal received by the non-contact type IC, reading voice data corresponding to the identification information from the storage means;

sound generation means for generating a sound based on the voice data read by the reading means;

determination means for determining success or failure of communication based on whether the identification information about the reader/writer is obtained from the signal received by the non-contact type IC; and display means for displaying the result of the determination by the determination means.

2. A mobile communication terminal having a function of performing wireless communication with a base station, the mobile communication terminal comprising:

a non-contact type IC for performing non-contact shod-distance communication with a reader/writer;

storage means for storing in advance voice data mutually different according to identification information identifying the reader/writer;

reading means for, based on the identification information of the reader/writer obtained from a signal received by the non-contact type IC, reading voice data corresponding to the identification information from the storage means and sound generation means for generating a sound based on the voice data read by the reading means; wherein, when the voice data corresponding to the identification information of the reader/writer is not stored in the storage means, the reading means reads second voice data which is stored in the storage means in advance to be used in the case of communication success, and causes the sound generation means to generate a sound based on the second voice data.

3. A mobile communication terminal having a function of performing wireless communication with a base station, the mobile communication terminal comprising:
  a non-contact type IC for performing non-contact short-distance communication with a reader/writer;
  storage means for storing in advance voice data mutually different according to identification information identifying the reader/writer;
  reading means for, based on the identification information of the reader/writer obtained from a signal received by the non-contact type IC, reading voice data corresponding to the identification information from the storage means and
  sound generation means for generating a sound based on the voice data read by the reading means; wherein, when a received signal is not inputted from the non-contact type IC, the reading means reads third voice data which is stored in the storage means in advance to be used in the case of communication failure, and causes the sound generation means to generate a sound based on the third voice data.

4. A mobile communication terminal having a function of performing wireless communication with a base station, the mobile communication terminal comprising:
  a non-contact type IC for performing non-contact short-distance communication with a reader/writer;
  storage means for storing in advance voice data mutually different according to identification information identifying the reader/writer;
  reading means for, based on the identification information of the reader/writer obtained from a signal received by the non-contact type IC, reading voice data corresponding to the identification information from the storage means and
  sound generation means for generating a sound based on the voice data read by the reading means; the voice data are stored in the storage means with any one of parameters of a tone, melody, sound volume, discontinuous sound pattern and voice set therefor in a manner that the parameter is mutually different among the voice data.

5. A method for controlling the operation of a mobile communication terminal which includes wireless communication means for performing wireless communication with a base station and a non-contact type IC for performing non-contact short-distance communication with a reader/writer, the method comprising the steps of:
  reading, from storage means in which voice data mutually different according to identification information identifying the reader writer are stored in advance, voice data corresponding to the identification information about the reader/writer obtained from the signal received by the non-contact type IC;
  causing sound generation means to generate a sound based on the voice data read by the reading means;
  when the voice data corresponding to the identification information about the reader/writer is not stored in the storage means, reading second voice data which is stored in the storage means in advance to be used in the case of communication success, and causing the sound generation means to generate a sound based on the second voice data.

6. A method for controlling the operation of a mobile communication terminal which includes wireless communication means for performing wireless communication with a base station and a non-contact type IC for performing non-contact short-distance communication with a reader/writer, the method comprising the steps of:
  reading, from storage means in which voice data mutually different according to identification information identifying the reader writer are stored in advance, voice data corresponding to the identification information about the reader/writer obtained from the signal received by the non-contact type IC; and
  causing sound generation means to generate a sound based on the voice data read by the reading means; when the voice data corresponding to the identification information about the reader/writer is not stored in the storage means, reading second voice data which is stored in the storage means in advance to be used in the case of communication success, and causing the sound generation means to generate a sound based on the second voice data.

7. A method for controlling the operation of a mobile communication terminal which includes wireless communication means for performing wireless communication with a base station and a non-contact type IC for performing non-contact short-distance communication with a reader/writer, the method comprising the steps of:
  reading, from storage means in which voice data mutually different according to identification information identifying the reader writer are stored in advance, voice data corresponding to the identification information about the reader/writer obtained from the signal received by the non-contact type IC; and
  causing sound generation means to generate a sound based on the voice data read by the reading means; when a received signal is not inputted from the non-contact type IC, reading third voice data which is stored in the storage means in advance to be used in the case of communication failure, and causing the sound generation means to generate a sound based on the third voice data.

8. A method for controlling the operation of a mobile communication terminal which includes wireless communication means for performing wireless communication with a base station and a non-contact type IC for performing non-contact short-distance communication with a reader/writer, the method comprising the steps of:
  reading, from storage means in which voice data mutually different according to identification information identifying the reader writer are stored in advance, voice data corresponding to the identification information about the reader/writer obtained from the signal received by the non-contact type IC; and
  causing sound generation means to generate a sound based on the voice data read by the reading means; wherein the voice data are stored in the storage means with any one of parameters of a tone, melody, sound volume, discontinuous sound pattern and voice set therefor in a manner that the parameter is mutually different among the voice data.

* * * * *